June 12, 1956 V. BUSH 2,749,869
PRESSURE BULB CONTROL MECHANISM FOR HYDROFOIL CRAFT
Filed July 27, 1951 4 Sheets-Sheet 1
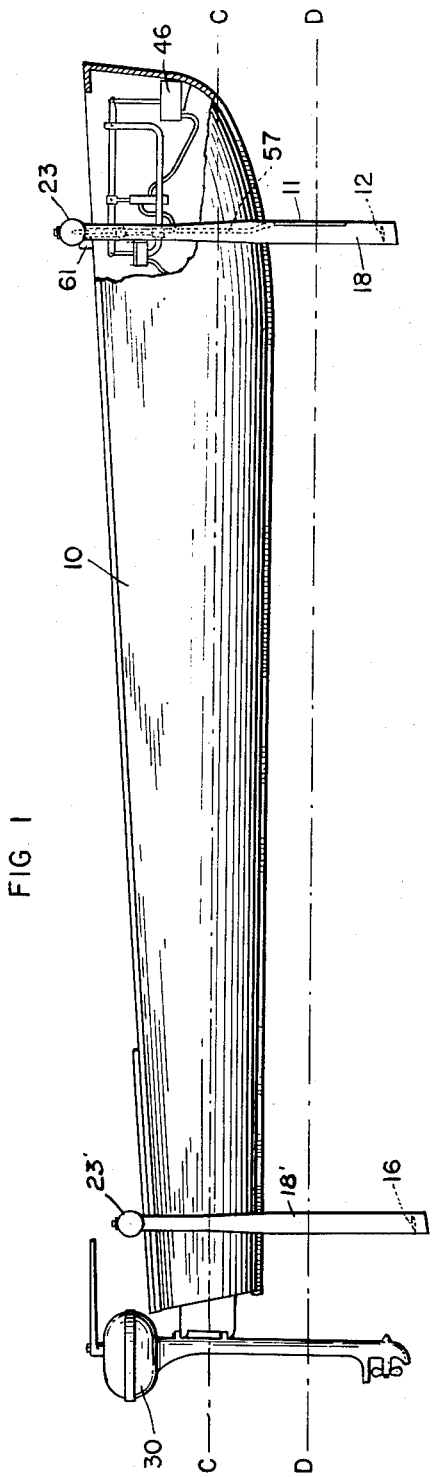
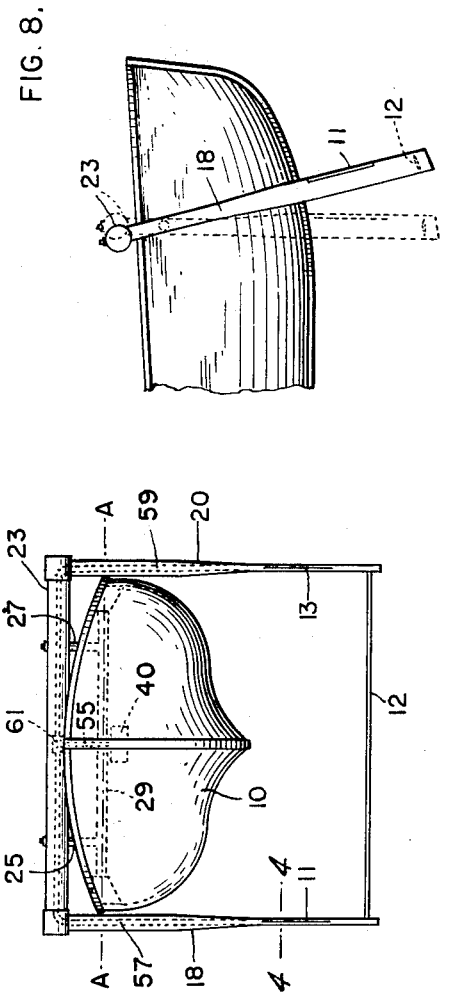
INVENTOR
VANNEVAR BUSH
BY
ATTORNEYS June 12, 1956 V. BUSH 2,749,869
PRESSURE BULB CONTROL MECHANISM FOR HYDROFOIL CRAFT
Filed July 27, 1951 4 Sheets-Sheet 2
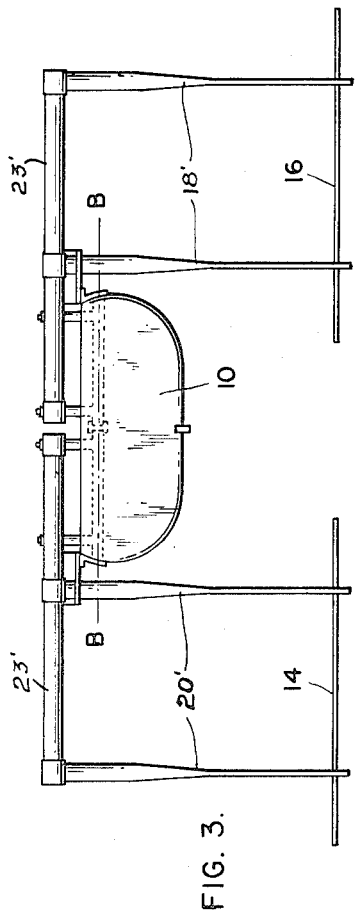
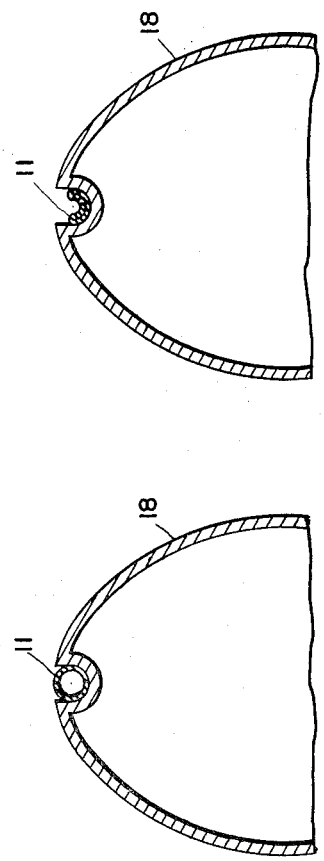
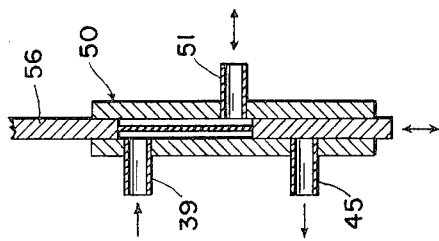
INVENTOR
VANNEVAR BUSH
BY
ATTORNEYS

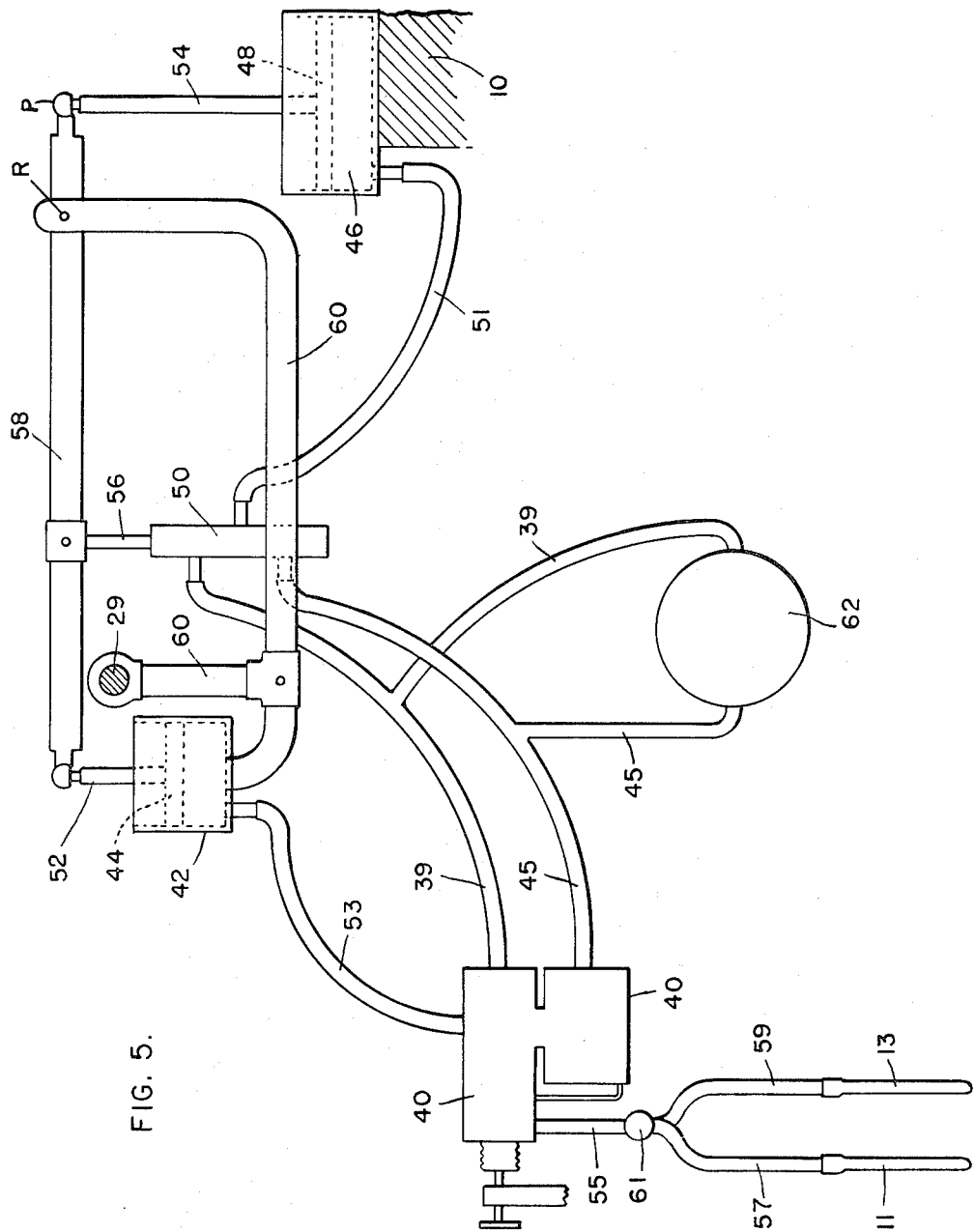

June 12, 1956  V. BUSH  2,749,869
PRESSURE BULB CONTROL MECHANISM FOR HYDROFOIL CRAFT
Filed July 27, 1951  4 Sheets-Sheet 4

INVENTOR
*VANNEVAR BUSH*

BY
*Semmes, Keegin, Robinson & Semmes*
ATTORNEYS

United States Patent Office 2,749,869
Patented June 12, 1956

2,749,869

PRESSURE BULB CONTROL MECHANISM FOR HYDROFOIL CRAFT

Vannevar Bush, East Jaffrey, N. H., assignor to The Hydrofoil Corporation, Washington, D. C., a corporation of Delaware Application July 27, 1951, Serial No. 238,945

14 Claims. (Cl. 114—66.5)

This invention relates to marine craft of the type dynamically supported on submerged hydrofoils. The primary object of my invention is to automatically maintain the lifting foils at the proper depth beneath the air-water interface and also to stabilize the craft both in pitch and roll.

The surface sensing device in my invention consists of a collapsible bulb, which is attached to the leading edge of a strut. The pressure within this bulb varies according to the depth to which the strut is submerged. This pressure variation is communicated to a novel valve which controls the hydraulic means for varying the lift of the supporting hydrofoils to maintain them at the proper operating depth. Other objects, advantages and features of my invention will appear from the following detailed description and accompanying drawings in which:

Figure 1 is a side elevation of a craft employing my invention.

Figure 2 is a view of the bow of the craft and the forward foil assembly.

Figure 3 is a view of the stern of the craft and the aft supporting foils.

Figure 4 is a partial cross-section of the forward starboard strut along line 4—4 of Figure 2.

Figure 7:
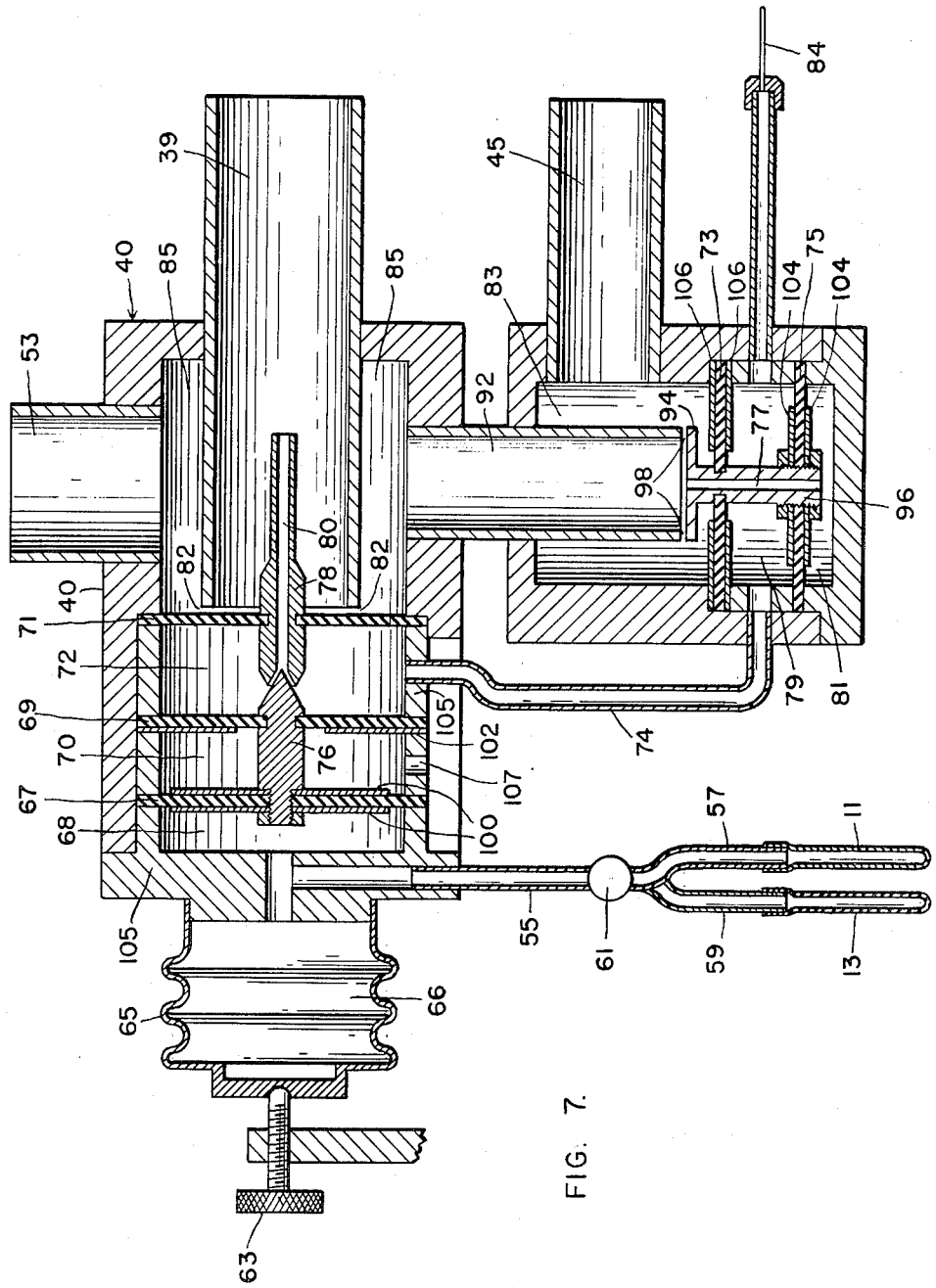

Figure 4-A is a similar partial cross-section view of the forward starboard strut along line 4—4 showing the bulb in its collapsed position.

Figure 5 is a diagrammatic drawing of the surface sensing and hydraulic control system and a detailed view of the foil assembly rotating mechanism shown in the bow of the craft in Figure 1.

Figure 6 is an enlarged view of slide valve 50.

Figure 7 is an enlarged view of control valve 40.

Figure 8 is a view of the forward foil assembly illustrating its operation.

To illustrate the construction and mode of operation of my invention, there has been selected a craft (Figures 1, 2 and 3) having hull 10 adapted to be supported out of the water at cruising speeds by forward foil 12 and rear foils 14 and 16. Forward foil 12 is connected to horizontal arm 23 by port and starboard struts 20 and 18, respectively, to form a frame straddling the bow of hull 10. Extending downwardly from and secured at their upper ends to horizontal arm 23 inside the hull 10 are rigid members 25 and 27. These members are attached at their other ends to axle element 29 which is rotatably mounted athwartship in hull 10 to be pivoted about axis A—A. The entire forward foil assembly is therefore pivotable as a unit about this axis A—A.

Two similar foil assemblies, one disposed on each side of the stern of the craft, and both pivotable about the axis B—B, are also provided. The rear assemblies are constructed similarly to those at the forward part of the craft and have been indicated by corresponding reference numerals primed. Propulsion of the craft may be by an outboard motor 30.

My invention is adapted so to position these pivotable foil assemblies that the lift from the supporting foils constantly maintains the hull 10 at a predetermined elevation above the water surface. The foil assembly for each of the three lifting foils 12, 14 and 16 may be positioned by a separate and independent control system, each of which is identical in construction and operation. Considering by way of example the system operating the forward foil assembly, collapsible bulbs 11 and 13 extend vertically in slots along the leading edges of struts 18 and 20 respectively (Figs. 2, 4). These bulbs may consist simply of thin-walled rubber tubing closed at one end. It is a characteristic of these bulbs that while they are readily collapsible, they have considerable resistance to expansion from an inside pressure greater than the surrounding pressure. Bulb 11 is connected by conduit 57 inside strut 18 and inside a portion of horizontal arm 23 to junction box 61 and thence to valve 40 through conduit 55. Bulb 13 is connected to junction box 61 by conduit 59. Valve 40, hereafter described in detail, communicates with cylinder 42 (Figure 5) through conduit 53, and is connected to hydraulic pump 62 by pressure conduit 39 and exhaust conduit 45. The same pressure and exhaust conduits also supply valve 50.

Cylinder 46 is mounted on hull 10. Piston 48 within cylinder 46 bears piston rod 54 to which is pivoted lever 58, at point P. Piston 44 operating in cylinder 42 in response to fluid pressure within the latter, serves to move piston rod 52 to rotate lever 58 about point P. This rotation also rotates frame member 60 which is pivoted to lever 58 at point R. Frame member 60 in turn rotates axle member 29 thereby rotating the entire foil assembly.

Rotation of lever 58 also operates rod 56 in slide valve 50 (Fig. 6). Rod 56 in slide valve 50 in its upper position passes pressure fluid from conduit 39 to cylinder 46 via conduit 51; in its intermediate position it closes conduit 51 and locks piston 48 in cylinder 46; and in its lower position it connects conduit 51 with exhaust conduit line 45. Any rotation of lever 58 moves rod 56 but if such motion is less than a predetermined distance, slide valve 50 will not open conduit 51 to permit flow of fluid through conduit 51 within the time constant of the system for example, while passing through waves, to move piston 48. Operation of piston 44 therefore constitutes a rapid fine adjustor of the foil system. When lever 58 rotates a predetermined amount, slide valve 50 will connect conduit 51 to supply pressure 39 or to exhaust conduit 45 according to the signal received from piston 44, and piston 48 will move up or down in response to the fluid pressure condition in cylinder 46 thereby rotating axle 29.

Referring to the detailed drawing of valve 40 (Fig. 7), chambers 66 and 68, together with bulbs 11 and 13 and the connecting conduits 55, 57 and 59, form a closed system so that a change in pressure at the bulb will be reflected throughout the system. Chamber 66 is shown as a substantially cylindrical compartment having adjustable bellows-like walls 65 and screw means 63 to vary the chamber volume. Chamber 68 is also shown as a substantially cylindrical chamber, the right hand wall of which is a pressure sensitive flexible diaphragm 67 which is attached to and supports one end of needle 76. Needle 76 is supported near its other end by diaphragm 69 which constitutes one wall of another substantially cylindrical chamber 72 in which needle 76 cooperates with the conical opening of valve seat element 78 to control the pressure communicated to chamber 72 from supply pressure conduit 39 through passage 80 in the center of valve seat element 78. Chamber 70, the end walls of which are formed by diaphragms 67 and 69, is not closed, but is open to atmospheric pressure through opening 107 in side wall 105. Needle 76 and valve seat element 78 constitute a pilot valve for controlling the operation of other valve elements which regulate the pressure transmitted to cylinder 42 (Fig. 5).

Flexible diaphragm 67 has metal reinforcing 100 which is shown as extending into needle 76, but not radially outward all the way toward the side walls 105. By this arrangement the diaphragm is rigidly attached to needle 76 but at the same time is movable under the influence of pressure changes in chamber 68 to position needle 76 with respect to its valve seat 78. Flexible diaphragm 69 is shown provided with metal reinforcing 102 extending from inside side wall 105 inwardly over a substantial portion of its surface but not quite to needle 76. This construction makes diaphragm 69 substantially unresponsive to pressure differences between chamber 72 and chamber 70 while still permitting movement of needle 76.

Opposite diaphragm 69 in chamber 72 is disposed a further flexible diaphragm 71 which supports valve seat element 78. Diaphragm 71, which has no metal reinforcing and hence is responsive to pressure differences on its opposite sides, provides a common wall between chamber 72 and chamber 85. It will be seen from an examination of Fig. 7 that in its neutral position diaphragm 71 on the side partially defining chamber 85 almost abuts the open end of supply pressure conduit 39, leaving very small clearance 82. Consequently, any movement of diaphragm 71 affects the pressure transmitted from conduit 39 into chamber 85. This, in turn, determines the pressure in cylinder 42 (Fig. 5) which is connected to chamber 85 by conduit 53.

Also leading from chamber 85 is conduit 92 which extends inside substantially cylindrical exhaust chamber 83 where it abuts the flange 94 of valve seat element 96 with small clearance 98, with the result that slight movement of valve seat element 96 will control the communication between conduit 92 and chamber 83. Chamber 83 is also connected to exhaust conduit 45. Chamber 79, which is shown as substantially cylindrical in shape, communicates with chamber 72 through conduit 74 so that chambers 79 and 72 are both at the same pressure. Chamber 79 is provided with vent 84 which permits a slight pressure leakage at all times. Flexible diaphragm 73 supports valve seat element 96 and forms a common wall between chamber 83 and chamber 79. The opposite wall of chamber 79 is provided by flexible diaphragm 75 which also serves as a wall for adjacent chamber 81, also substantially cylindrical in shape and coaxial with chambers 79 and 83. Passage 77 in the center of valve seat element 96 provides communication between conduit 92 and chamber 81 so that similar pressure is always present in chamber 85, conduit 92 and chamber 81.

Diaphragm 73 is shown provided with metal reinforcing 106 arranged similarly as that for diaphragm 69, rendering diaphragm 73 substantially unresponsive to pressure differences between chamber 83 and chamber 79, yet permitting the movement of valve seat element 96. Diaphragm 75 conversely has metal reinforcing 104 arranged similarly to that for diaphragm 67, so that while it is rigidly connected to valve seat element 96, it is nevertheless responsive to pressure differences between chamber 79 and chamber 81.

In operation, the mechanism for rotating the foil assembly will be seen to respond to pressure signals from the bulbs 11 and 13 in the following manner:

Since bulbs 11 and 13 are readily collapsible, when the craft is advancing at relatively low velocities, the submerged portions of the bulbs are completely collapsed by the dynamic water pressure against them (Fig. 4A). Thereafter, increases in dynamic pressure resulting from increased velocities have no further effect on the bulbs. Moreover, since the dynamic pressure of the air is relatively insignificant compared to that of the water, only that portion of each bulb which is below the water surface is collapsed. In addition, the portion of the bulb exposed only to the air does not expand significantly from its normal shape as the pressure therein is increased and exceeds the surrounding outside pressure. The pressure which the bulb exerts upon conduit 55 and chamber 68 (Figure 7) are therefore functions of depth of submergence of the bulb alone and are independent of velocity.

The volume of chamber 66 may be so adjusted that when a predetermined total length of both bulbs is collapsed, the pressure in the closed system (11, 13, 57, 59, 55, 66, 68) is sufficiently great to move diaphragm 67 to the right thereby forcing needle 76 into conical seat 78. This closing of the needle valve results in cutting off the supply pressure to chamber 72 from conduit 39 via passage 80. The fluid in chambers 72 and 79 then vents through 84 thereby dropping the pressure in these chambers. The drop in pressure in chamber 72 tends to collapse flexible diaphragm 71 to the left to pull it away from the open end of conduit 39. This movement to the left increases clearance 82 to make the supply pressure from conduit 39 available in chamber 85, and through conduit 53, to cylinder 42. At the same time, by virtue of the connection between chamber 85 and chamber 81 via conduits 92 and 77, and their consequent identity in pressure, and by virtue of the fact that the pressure in chamber 79 is the same as that in chamber 72, and the latter pressure being lower than the former, valve seat flange 94 is closed against the ends of conduit 92 in chamber 83 thereby blocking the pressure exhaust 45 from chamber 85 and cylinder 42.

As the pressure increases in chambers 85 and 81 and pressure decreases in chambers 72 and 79, clearance 82 becomes even wider and valve seat flange 94 is even more firmly pressed against the open ends of conduit 92.

It will be seen, therefore, that as a result of these occurrences in valve 40, an increased supply of pressure is provided to cylinder 42 via conduit 53 in response to an increased pressure signal from bulbs 11 and 13. This increase in pressure in cylinder 42 will be seen to raise the piston 44 and its rod 52 with the effect described below.

Conversely, when, because of the emergence of bulbs 11 and 13 from below the water surface, the pressure in the closed system (11, 13, 57, 59, 55, 66, 68) decreases, opposite reactions occur in valve 40. Thus, diaphragm 67 moves to the left, drawing needle 76 away from its seat 78 to permit the pressure in chambers 72 and 79 to rise to supply pressure. With supply pressure in chamber 79 and supply pressure or less than supply pressure in chamber 81 and conduit 92, valve seat flange 94 will move away from the end of conduit 92, thus opening chambers 81 and 85 into exhaust chamber 83. With the resulting drop in pressure in chamber 85 and with supply pressure in chamber 72, diaphragm 71 will move to the right to close against the open end of conduit 39 thereby cutting off supply pressure to chamber 85 and conduit 53 leading to cylinder 42. Cylinder 42 and chamber 85 then exhaust through chamber 83 and conduit 45.

When the supply pressure is thus cut off from chambers 85 and 81, and instead introduced into chambers 72 and 79, diaphragm 71 will close even more tightly against the open end of conduit 39, while conversely the valve 96 will be drawn downwardly away from the open end of conduit 92 to increase clearance 98.

Thus, it will be seen that valve 40 operates to control the pressure in cylinder 42 by connecting the pressure supply conduit 39 and blocking the exhaust line 45 when the pressure in the deformable bulbs 11, 13 is in excess of a predetermined value; and, conversely, to block the pressure supply line to cylinder 42 and open the exhaust line 45 therefrom when the bulb pressure is less than the predetermined value. The latter may be adjusted to be the value of bulb pressure corresponding to the desired depth of strut submergence.

When valve 40 causes the pressure in cylinder 42 to be increased, piston 44 is displaced upward in cylinder 42. As piston rod 52 is thus forced upward by piston 44, lever 58 will be seen to rotate about point P. This rotation also rotates frame member 60 and causes valve rod 56 to move upward in slide valve 50. If rotation of lever 58 continues to a predetermined point, slide valve 50 will connect pressure conduit 39 to conduit 51 (see Fig. 6), thus providing pressure to cylinder 46 and displacing piston 48 upwardly. Since cylinder 46 is fixedly secured to the hull 10, the upward movement of piston 48 and rod 54 results in the further rotating of the frame and axial members 60 and 29 about axis A—A, thereby pivoting the lower portion of struts 18 and 11 with foil 12 forwardly toward the position shown in the solid lines of Fig. 8.

Conversely, when valve 40 removes pressure from cylinder 42, lever 58 rotates in the reverse direction about point P and if such rotation exceeds a certain value valve rod 56 plunges downward in slide valve 50, connecting exhaust conduit 45 to cylinder 46 through conduit 51. The pressure in this cylinder 46 is consequently reduced, permitting piston 48 to descend, which it has a tendency to do since the force of water against the submerged portion of the foil assembly acts to return the latter toward the vertical position shown in Fig. 1 and in the dotted lines of Fig. 8.

From the foregoing description of various portions of my apparatus and of the manner in which each operates, it will readily be seen that a craft equipped with my novel apparatus will function as follows:

When the craft is at rest or moving slowly, hull 10 is supported by displacement and the water line is approximately at C—C (Fig. 1). As the craft gains speed, the bulbs 11 and 13, being entirely submerged, are completely collapsed by the dynamic water pressure against them, with the result that the forward foil assembly is rotated forward to its position of maximum lift (Fig. 8). This position tends to raise the craft on the foils as sufficient speed is attained. With further increases in speed, the hull 10 rises on its foils until it is completely out of the water. The struts and bulbs attached thereto accordingly partly emerge from the water. After bulbs 11 and 13 have emerged a predetermined extent, the decreased pressure signal to valve 40 causes the latter to permit piston 42 to exhaust. This, in turn, causes piston 46 to exhaust, thereby removing from the forward foil assembly the torque which holds foil 12 in its advanced position (Fig. 8). The profile drag on the foil assembly then acts to rotate foil 12 backward, decreasing the lift thereof. As soon as the foil lift becomes insufficient to support the hull, the craft begins to descend, resubmerging the bulbs 11, 13 to a depth which will restore the forward-rotating torque to the foil assembly. The craft then settles down to the predetermined depth of foil submergence with the water line at approximately D—D (Fig. 1) and being kept at this level by the fine adjustment piston 44 despite the orbital motion of water particles resulting from wave action.

From a consideration of the foregoing, it will be seen that my novel surface sensing apparatus provides a simple and effective method for continuously detecting the air-water interface without the stepwise discontinuity which results when a series of detecting elements are used, and without the mechanical difficulties encountered with a floating or surface planing member. The bulb device is accurate, sturdy and dependable. It is not affected by foreign matter in the water which might otherwise cause a false signal, nor is it susceptible of being fouled or damaged since it has no delicate exposed parts. In addition, my invention automatically accommodates changes in speed. Thus, if the speed is increased, causing the craft to rise as a result of the increased foil lift, by the operation above described, the foil assembly tends to rotate backward to a new position at which the lift from the foil just maintains the hull supported at the predetermined distance above the water surface.

Moreover, my invention maintains the hull supported at the same predetermined distance above the water for different craft loads. For each load, the foil will be advanced until sufficient lift is developed thereon to maintain the craft properly supported. The position of the foil assembly and the angle of attack of the supporting foil will change with different loads, but the depth of foil submergence will remain the same.

Furthermore, my invention functions equally well in rough water as in smooth. Although the bulbs are sensitive to surface waves, the inertia of the foil assembly and the foil assembly rotating mechanism provide a sufficiently long time constant for the craft to assure a foil submergence at the predetermined depth measured from the mean water level, averaging out the effect of the waves.

The foregoing description of the construction and operation of my invention as applied to the forward foil is equally applicable to the rear foils, each of which is independently controlled in a similar manner by a separate pressure actuated mechanism identical to that which operates the forward foil. By having the hull of the craft supported at three points by hydrofoils, each of which is automatically maintained at a predetermined depth of submergence, the craft hull is at all times maintained parallel to the water surface and stabilized in pitch and roll. Furthermore, since, by my invention each foil is maintained at a constant submergence depth regardless of craft load, the illustrative craft will maintain its stability even under conditions of shifting loads from one part of the craft to another.

It is to be understood that my novel bulb and valve apparatus may be employed with equal success on craft having other types of hydrofoil means, for example, with a craft whose hull is rigidly supported by hydrofoils which are equipped with flaps for varying foil lift, with foils pivoted for rotation about a span-wise axis or any combination of such hydrofoil structures. The novel depth sensing device of the present invention manifestly can be combined with a variety of means, for example, a transducer, for controlling any one of a variety of sources of power to vary the lift of the hydrofoils. Furthermore, my novel pressure-sensitive valve, used in the above described control mechanism to provide constant foil depth, has many general applications as a controller for maintaining a variable condition at substantially a given value. It also has application as a relatively high capacity control valve responsive to very slight signal pressure variations.

I claim:

1. A marine craft of the type supportable on submerged hydrofoils comprising a hull, fore and aft hydrofoils, struts pivotally mounted on the hull for swinging movement about transverse axes above the displacement water line of the hull, means mounting the hydrofoils on the free ends of the struts, fluid actuated means for shifting the struts about said axes to vary the angle of attack of the hydrofoils, and flexible pressure deformable air-water interface sensing means in the lower portions of said struts for controlling the supply and discharge of fluid to said actuating means in dependence on the degree of deformation of said sensing means.

2. A marine craft of the type supportable on submerged hydrofoils comprising a hull, fore and aft hydrofoils, struts pivotally mounted on the hull for swinging movement about transverse axes above the displacement water line of the hull, means mounting the hydrofoils on the free ends of the struts, fluid actuated means for shifting the struts about said axes to vary the angle of attack of the hydrofoils, collapsible tubes mounted on the lower forward portions of the struts for submergence in water when the hull is supported by displacement and for partial submergence when the hull is supported by the hydrofoils, valve means for controlling the supply and discharge of fluid to said fluid actuated means, and independent fluid pressure actuated means responsive to the collapsible condition of the tubes for controlling the position of said valve means.

3. A marine craft of the type supportable on submerged hydrofoils comprising a hull, members rotatably mounted between the sides of the hull at the fore and aft portions thereof and extending transversely of the hull, fore and aft hydrofoils, struts mounted on said members and extending downwardly below the hull for swinging movement about the axes of said members, means mounting the hydrofoils on the free ends of the struts, fluid actuated means for shifting the struts about said axes to vary the angle of attack of the hydrofoils, and flexible pressure deformable air-water interface sensing means in the lower portions of said struts for controlling the supply and discharge of fluid to said actuating means in dependence on the degree of deformation of said sensing means.

4. A marine craft of the type supportable on submerged hydrofoils comprising a hull, members rotatably mounted between the sides of the hull at the fore and aft portions thereof and extending transversely of the hull, fore and aft hydrofoils, struts mounted on said members and extending downwardly below the hull for swinging movement about the axes of said members, means mounting the hydrofoils on the free ends of the struts, fluid actuated means for shifting the struts about said axes to vary the angle of attack of the hydrofoils, collapsible tubes mounted on the lower forward portions of the struts for submergence in water when the hull is supported by displacement and for partial submergence when the hull is supported by the hydrofoils, valve means for controlling the supply and discharge of fluid to said fluid actuated means, and independent fluid pressure actuated means responsive to the collapsible condition of the tubes for controlling the position of said valve means.

5. In a craft having a hull supported above the water surface during cruising by a variable lift hydrofoil secured below the hull by a vertical strut, hydraulic means for varying the lift of said hydrofoil to maintain the hull during operation at a constant predetermined altitude above the water surface, said hydraulic means including a pressure operated controller adapted to regulate the fluid pressure in said hydraulic means and thereby regulate the hydrofoil lift, a closed variable volume connected to said controller and adapted to provide a pressure signal to said controller according to the magnitude of said closed volume, said closed volume including a flexible bulb extending vertically below the hull and adapted to be collapsed according to the extent to which said bulb is submerged below the water surface.

6. In a craft having a hull supported above the water surface during cruising by a variable lift hydrofoil secured below the hull by a vertical strut, mechanical means for varying the lift of said hydrofoil, hydraulic means for regulating said mechanical means to maintain the hull during operation at a constant predetermined altitude above the water surface, said hydraulic means including a pressure operated controller adapted to regulate the fluid pressure in said hydraulic means and thereby regulate the hydrofoil lift, a closed variable volume connected to said controller and adapted to provide a pressure signal to said controller according to the magnitude of said closed volume, said closed volume including a flexible bulb extending vertically below the hull and adapted to be collapsed according to the extent to which said bulb is submerged below the water surface.

7. In a craft adapted to be supported above the water surface during operation by variable lift hydrofoil means secured below the craft to a vertical strut, said craft having mechanical means for varying the hydrofoil lift, apparatus for actuating said mechanical means to maintain the craft during operation at a constant predetermined altitude above the water surface, said apparatus comprising pressure sensitive means, said means having an element thereof disposed to extend substantially vertically below the bottom of the craft to at least part of the length of the strut, a first hydraulic cylinder, a piston adapted to move in said cylinder in response to increased fluid pressure in said cylinder, linkage connecting said piston with said mechanical means to actuate the latter to provide increased hydrofoil lift upon the occurrence of an increase in fluid pressure in said first cylinder, conduit means leading from said first cylinder, a source of pressure fluid, said source having an intake and a relatively high pressure outlet, a first valve means adapted to connect said conduit means either with the said intake or with the relatively high pressure outlet, a second hydraulic cylinder having a pressure responsive piston connected to operate said first valve means to one position or the other, depending upon the fluid pressure in said second cylinder, a second valve means, the last said valve means being responsive to predetermined pressure detected by the pressure responsive means extending below the bottom of the craft, said second valve means having a chamber communicable with either the intake or the relatively high pressure outlet of said pressure fluid source, conduit means between said second cylinder and said chamber, said second valve means being adapted either to permit the passage of pressure fluid from said source thereof to the second hydraulic cylinder and simultaneously closing said chamber from communication with the intake of the pressure source when a predetermined pressure is detected by the pressure sensitive means, or to close off said chamber from the pressure fluid source while simultaneously opening communication between said chamber and the intake of the fluid source when such predetermined pressure is not so detected by said pressure sensitive means.

8. In combination with a displacement craft adapted to be supported above the water surface by hydrofoil means, apparatus for varying the hydrofoil lift to maintain the craft during operation at a constant predetermined height above the water surface, said apparatus comprising a vertical strut extending downwardly below the bottom of the craft, said strut being pivotally secured to the craft to permit forward rotation of the lower portion of the strut about the pivot point in a fore and aft plane, a hydrofoil secured horizontally in the vicinity of the lower extremity of the strut, pressure sensitive means, said means having an element thereof disposed to extend substantially vertically below the bottom of the craft to at least part of the depth of the strut, a first hydraulic cylinder, a piston adapted to move in said cylinder in response to increased fluid pressure in said cylinder, linkage mechanically connecting said piston with said strut to effect forward rotation of the lower portion of said strut upon occurrence of an increase in pressure in said first cylinder, conduit means leading from said first cylinder, a source of pressure fluid, said source having an intake area and a relatively high pressure outlet, a first valve means adapted to connect said conduit means with either the said intake area or the relatively high pressure outlet of said pressure fluid source, a second hydraulic cylinder having a pressure responsive piston connected to operate said first valve means upon the occurrence of an increase in fluid pressure in said second cylinder, a second valve means, the last said valve means being responsive to a predetermined pressure detected by the pressure responsive means extending below the bottom of the craft, said second valve means further having a chamber communicable with either the intake area or the relatively high pressure outlet of said pressure fluid source, conduit means between said second cylinder and said chamber in said second valve means, said second valve means being adapted to either permit the passage of pressure fluid from said source thereof to the second hydraulic cylinder and simultaneously closing said chamber from communication with the intake area of the pressure source when a predetermined pressure is detected by the pressure sensitive means, or to close off said chamber from the pressure fluid source while simultaneously opening communication between said chamber and the intake area of the fluid source when such predetermined pressure is not so detected by said pressure sensitive means.

9. In a marine craft of the type supportable on submerged hydrofoils and wherein the lift produced by said hydrofoils is variable, a hull, fore and aft hydrofoils, struts pivotally mounting said hydrofoils for controlling the depth of submergence thereof, the improvement comprising means for sensing the depth of submergence of said hydrofoils and controlling the lift developed by the foils in dependence on the depth of submergence, including a closed volume pressure responsive system having a portion thereof projecting below the hull, the static volume of said system being adjustable and pressure in said system being variable in dependence on the adjusted static volume and on depth of submergence of a said strut.

10. In a hydrofoil craft having supporting hydrofoils adjustably mounted for controlling the depth of submergence thereof, means for adjusting the lift developed by said hydrofoils, including a closed volume pressure responsive system having a portion thereof projecting below the hull of said craft, the static volume of said system being selectively adjustable, pressure in said system being variable in dependence on the adjusted static volume and on the depth of submergence of a said hydrofoil and operative for controlling lift developed by said hydrofoils commensurate with said submergence.

11. In a hydrofoil craft having supporting hydrofoils adjustably mounted for controlling the depth of submergence thereof and struts carrying said hydrofoils, means for adjusting the lift developed by said hydrofoils, including a closed volume pressure responsive system having a portion thereof projecting below the hull of said craft, the static volume of said system being selectively adjustable, means for sensing the depth of submergence of said hydrofoils, said sensing means comprising a collapsible bulb mounted on the leading edge of a strut and, when said craft is supported by said hydrofoils, extending partially above and partially below the water line.

12. Water craft having hydrofoils for supporting a hull above a water surface including struts carrying said hydrofoils, a foil submergence control element on at least one said strut adapted for partial submergence when said hull is supported by said hydrofoils above the surface, said control element varying the lift developed by said hydrofoils continuously responsive to and in accordance with the amount of said control element submerged.

13. In a craft adapted to be supported above the water surface during operation by variable lift hydrofoil means secured below the craft to a downward extending strut, said craft having mechanical means for varying the hydrofoil lift, apparatus for actuating said mechanical means to maintain the craft during operation at a constant predetermined altitude above the water surface, said apparatus comprising pressure sensitive means, said means having an element thereof disposed to extend below the bottom of the craft to at least part of the depth of the strut, a first hydraulic cylinder, a piston adapted to move in said cylinder in response to increased fluid pressure in said cylinder, linkage connecting said piston with said mechanical means to actuate the latter to provide increased hydrofoil lift upon the occurrence of an increase in fluid pressure in said first cylinder, conduit means leading from said first cylinder, a source of pressure fluid, said source having an intake and an outlet having a substantially different pressure than the supply pressure, a first valve means adapted to close said conduit means or to connect said conduit means either with the said intake or with the substantially different pressure outlet, a second hydraulic cylinder having a pressure responsive piston connected to operate said first valve means to close said conduit or to open said conduit to communicate either with said intake or said outlet, depending upon the fluid pressure in said second cylinder, a second valve means, the last said valve means being responsive to predetermined pressure detected by the pressure responsive means extending below the bottom of the craft, said second valve means having a chamber communicable with either the intake or the substantially different pressure outlet of said pressure fluid source, conduit means between said second cylinder and said chamber, said second valve means being adapted either to permit the passage of pressure fluid from said source thereof to the second hydraulic cylinder and simultaneously closing said chamber from communication with the intake of the pressure source when a predetermined pressure is detected by the pressure sensitive means, or to close off said chamber from the pressure fluid source while simultaneously opening communication between said chamber and the intake of the fluid source when such predetermined pressure is not so detected by said pressure sensitive means.

14. In a craft having a hull and submerged hull sustaining hydrofoils, wherein the lift produced by said hydrofoils is variable for controlling the depth of submergence thereof, a closed flexible volume pressure system in which pressure varies with depth of submergence of the hydrofoils, a first pressure responsive diaphragm in the system partially defining said volume, valve means in the system, said valve means having a movable closure element carried by said first diaphragm, a chamber in the system having venting means and being supplied with pressure through said valve means when the valve is open, a second pressure responsive diaphragm partially defining said first chamber, a valve seat connected to said second diaphragm, pressure supply and pressure exhaust conduits connected to the chamber, said valve seat being adapted to block alternatively the pressure supply conduit and the pressure exhaust conduit for said pressure responsive device according to the position of said second diaphragm, said system being interconnected with said hydrofoils for varying lift developed by the foils in accordance with their depth.

References Cited in the file of this patent

UNITED STATES PATENTS

| 16,593 | Elliott | Feb. 10, 1857 |
| 1,446,439 | Lieberman | Feb. 20, 1923 |
| 2,139,303 | Greg | Dec. 6, 1938 |
| 2,257,406 | Von Burtenbach | Sept. 30, 1941 |
| 2,387,907 | Hook | Oct. 30, 1945 |
| 2,550,220 | Bussei | Apr. 24, 1951 |
| 2,569,881 | Davis | Oct. 2, 1951 |
| 2,576,716 | Gardiner | Nov. 27, 1951 |
| 2,583,185 | McLeod | Jan. 22, 1952 |

FOREIGN PATENTS

| 256,372 | Germany | Feb. 8, 1913 |